United States Patent [19]
Parkhomenko et al.

[11] Patent Number: 4,835,657
[45] Date of Patent: May 30, 1989

[54] EXPLOSION-PROOF ELECTRICAL UNIT

[76] Inventors: Alexandr I. Parkhomenko, prospeckt Dzerzhinskogo, 2, kv.251.; Vitaly S. Dzjuban, ulitsa 50-letia SSSR, 37, kv.41.; Eduard P. Moskalev, prospekt Iliicha, 54, kv.10., all of Donetsk, U.S.S.R.

[21] Appl. No.: 130,899

[22] Filed: Dec. 10, 1987

[51] Int. Cl.$^4$ .............................................. H05K 5/00
[52] U.S. Cl. ...................................... 361/357; 361/344; 200/43.22; 200/51.12; 174/50.54
[58] Field of Search ................ 307/147; 361/334, 335, 361/341, 343, 344, 356, 357, 426, 428; 174/50, 50.54, 52 R, 22 R, 23 R, 77 R; 200/43, 22, 50 A, 51.09, 51.12

[56]  References Cited
U.S. PATENT DOCUMENTS
4,213,018  7/1980  Piston ............................. 200/51.12
4,520,243  5/1985  McIntyre ........................ 200/51.09

FOREIGN PATENT DOCUMENTS
1501818  2/1978  United Kingdom .

OTHER PUBLICATIONS
Explosion Protection Standards... Europe, EX Magazine #9, Oct. 1983, Dr. Schimmele, pp. 3–11.
Simplex GE ®, Wallacetown ®, Type A74 Flamproof Two Motor Starter or Two Speed Starter.
Article, "Electrical Equipment for the Mining Industry", 4 p., Simplex (GE), Scotland.

Primary Examiner—Gerald P. Tolin
Attorney, Agent, or Firm—Ladas & Parry

[57]  ABSTRACT

An explosion-proof electrical unit comprises an explosion-protected chamber for leading-in current conductors and an explosion-protected equipment chamber divided by a blast-resistant wall, and through current conducting terminals secured on the blast-resistant wall. The current conducting part of each terminal inlcudes at least two elements, of which one such element is movable. In one extreme position of the movable element this movable element and the fixed element are electrically closed, whereas in the other extreme position of the movable element they are open. A cavity formed between the movable and fixed elements of the current conducting part of each through terminal is explosion-protected.

14 Claims, 4 Drawing Sheets

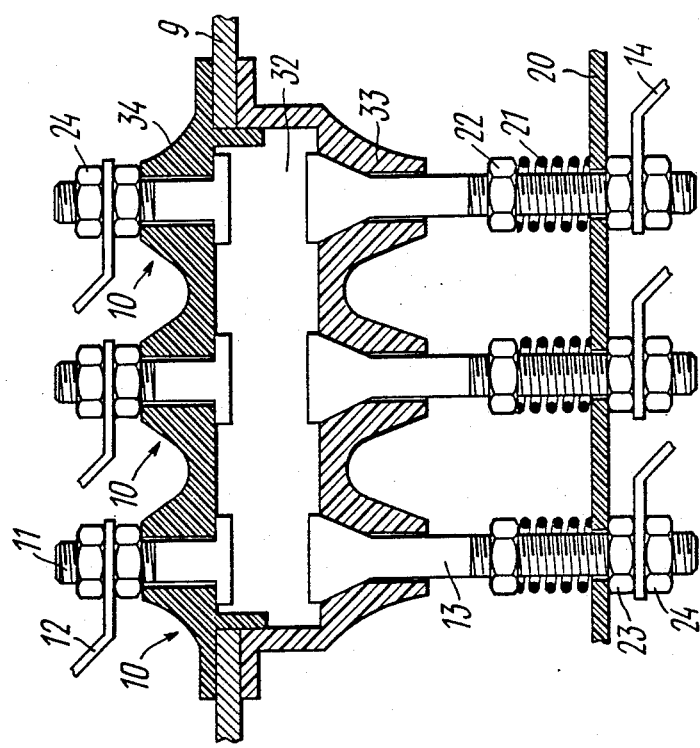
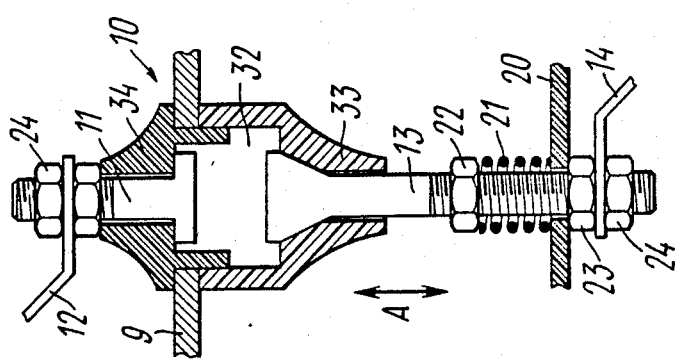

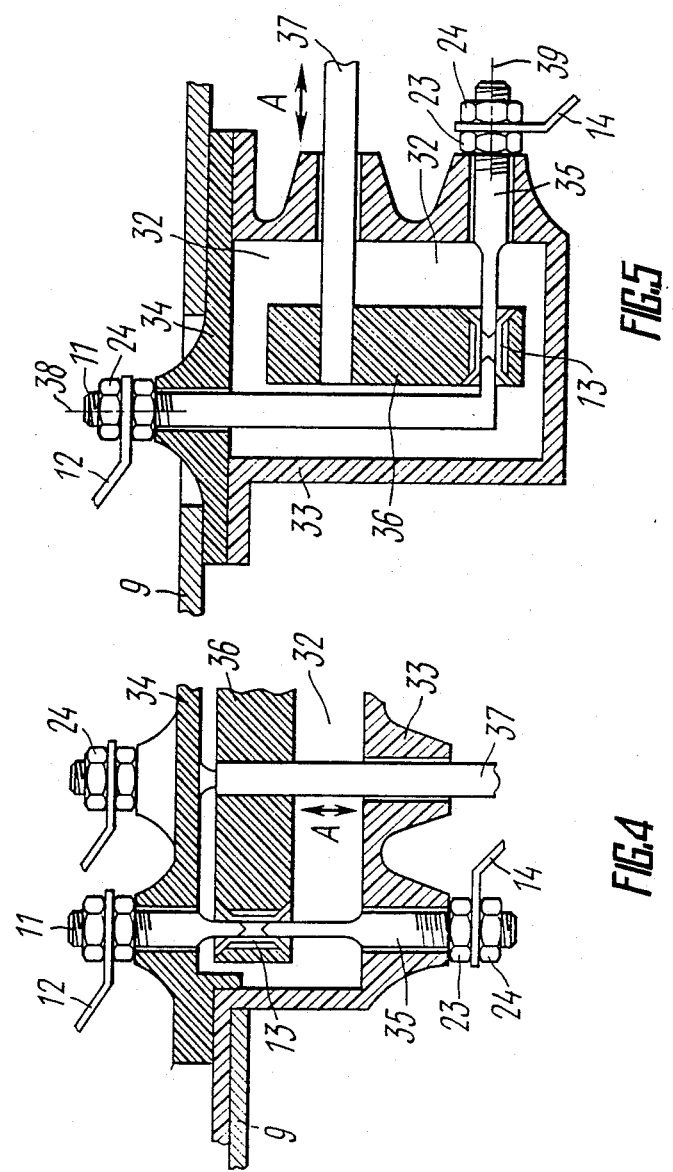

EXPLOSION-PROOF ELECTRICAL UNIT

FIELD OF THE INVENTION

This invention relates generally to switching equipment for distributing electric power, and more particularly to explosion-proof electrical units.

The invention can find application in chemical plants and in coal mines having an explosive atmosphere, more specifically in explosion-proof electrical equipment, such as explosion-protected magnetic starters, automatic switches and control equipment packages.

BACKGROUND OF THE INVENTION

There is known an explosion-proof electrical unit, such as a magnetic starter of the Wallacetown Co. of Great Britain (cf., "Electrical Equipment for the Mining Industry" pp. 3 and 4) in which elements of the electric circuit, such as contactors, automatic switches and transformers are accommodated in an explosion-protected equipment chamber closable by a cover plate to facilitate access to these elements for servicing and repairs. Apart from the equipment chamber, this construction of an explosion-proof electrical unit includes three separate explosion-protected chambers: a chamber for leading-in current conductors to lead-in a feeding cable, a chamber for leading out current conductors, for example, in the form of a plug-and-socket connector to lead out the cable connecting the explosion-proof electrical unit to a load, such as an electric motor, and a chamber for accommodating the isolator a drive mechanism of which is mechanically linked with the cover plate of the equipment chamber in such a manner that the cover plate is openable only with the disconnected isolator, and consequently in the absence of voltage at the elements of the electric circuit of the explosion-proof electrical unit. Cores of the feeding cable are electrically connected to the input terminals of the isolator via through current conducting terminals disposed at a blast-resistant wall between the explosion-protected chambers for leading-in the current conductors and isolator. The output terminals of the isolator are electrically connected to the elements of the electric circuit of the explosion-proof electrical unit via through current conducting terminals arranged at the blast-resistant wall between the explosion-protected chamber for leading-in current conductors and equipment chamber. The elements of the electric circuit of the explosion-proof electrical unit are electrically connected to the current conducting cores of the cable connecting this unit with the load via through current conducting terminals arranged at the blast-resistant wall between the explosion-protected equipment chamber and the chamber for leading out the current conductors. The blast-resistant chamber of the isolator is enclosed by a cover plate ensuring access from the outside to this chamber for assembling and servicing the isolator.

This prior art unit is complicated structurally, has a substantial weight and size, and is difficult to manufacture. These disadvantages are due mainly to excessive weight and size of the explosion-protected chamber of the isolator, provision of the partition wall with through current conducting terminals between the explosion-protected chambers of the isolator and equipment chamber, and cover plate of the explosion-protected chamber of the isolator with fastening members and explosion-proof flanges. In addition, excessive number of contact resistance at the points of connection of the current conductors, viz., at the through current conducting terminals from the chamber for leading-in current conductors to the chamber of isolator, at the input and output terminals and contacts of the isolator, and at the through terminals from the isolator chamber to the equipment chamber results in excessive heating of the elements inside the explosion-protected chambers and necessitates a reduction in the current loads or, while maintaining the rated current parameters of the unit, requires an increase in the rated current of the current conductors and elements of the unit to result in a larger overall size, heavier weight, and more labor consuming production of the explosion-proof electrical unit.

There is also known an explosion-proof electrical unit (cf., GB, A, No. 1,501,818) comprising an explosion-protected chamber for leading-in current conductors to lead-in a feeding cable, an explosion-protected equipment chamber accommodating elements of electric circuit of the unit, a cover plate of the explosion-protected equipment chamber, a blast-resistant wall dividing the explosion-protected chamber for leading-in current conductors and equipment chamber, through current conductiing terminals secured at the blast-resistant wall and intended to electrically connect the elements of the electric circuit of the unit with current carrying cores of the feeding cable, and a drive mechanism mechanically linked with the cover plate of the explosion-protected equipment chamber. The unit further includes an isolator, an explosion-protected chamber of the isolator arranged in the equipment chamber and having two cover plates on which there are mounted the through current conducting terminals for electrically connecting the output leads of the isolator with the elements of the electric circuit of the unit and with the current-carrying cores of the feeding cable.

However, this prior art construction of an explosion-proof electrical unit is bulky, heavy-weight and labor consuming in manufacture, since it includes an isolator, a separate explosion-protected chamber thereof, and a blast-resistant wall with the through terminals ensuring electrical connection between the output leads of the isolator and elements of the electrical circuit of the unit.

One characteristic feature of this explosion-proof unit construction is large number of connections between the current conductors causing substantial heating of the elements of the electric circuit of the unit and necessitating a larger size and weight of the unit. In addition, servicing of the isolator is difficult, because access thereto is possible only after opening the cover plate of the explosion-protected chamber for leading-in the current conductors, disconnecting the cores of the feeding cable and conductors in the equipment chamber from the through terminals at both cover plates of the explosion-protected isolator chamber, and removing the isolator from its chamber.

The invention aims at providing an explosion-proof electrical unit in which it would be possible to dispense with an isolator, as well as with an individual explosion-protected chamber thereof having through current conducting terminals for electrically connecting output leads of the isolator with elements of the electric circuit of the unit to thereby reduce the weight, size and amount of labor consumed for fabrication of the explosion-proof electrical unit.

SUMMARY OF THE INVENTION

It is an object of the present invention to provide an explosion-proof electrical unit which would be lighter in weight, smaller in size, and require less labor for its manufacture.

The aims of the invention are attained by that in an explosion-proof electrical unit comprising an explosion-protected chamber for leading-in current conductors to lead-in a feeding cable, an explosion-protected equipment chamber accommodating elements of an electric circuit of the explosion-proof electrical unit, a cover plate of the explosion-protected equipment chamber, a blast-resistant wall separating the explosion-protected chamber for leading-in current conductors and equipment chamber, through current-conducting terminals secured at the blast-resistant wall and intended to electrically connect the elements of the electric circuit with current-carrying cores of the feeding cable, and a drive mechanism mechanically linked with the cover plate of the explosion-protected equipment chamber, according to the invention, the current-conducting part of each through terminal includes at least two elements one of which is capable of movement, in one extreme position of the movable element this latter element and the fixed element being electrically closed, whereas in the other extreme position of the movable element these two elements are open, each through terminal being provided with a means for explosion-protecting a cavity formed between the open movable and fixed elements of the current conducting part of this through terminal.

In order to avoid the use of flexible current conductors connecting the through terminals with elements of the electric circuit, the current conducting part of each through terminal preferably includes three elements with the movable element disposed between the two fixed elements of the current conducting part of the through terminal.

To simplify the unit structurally, the elements of the current conducting part of each through terminal are arranged coaxially.

For simplifying the linkage between the drive mechanism and movable elements of the current conducting parts of the through terminals the longitudinal axes of the fixed elements of the current conducting part of each through terminal are advisably arranged at an angle to each other.

Preferably, the movable element of the current conducting part of each through terminal is arranged to be capable of rectilinear motion.

Preferably, the movable element of the current conducting part of each through terminal is arranged to be capable of circumferential motion.

For making the assembly of through terminals as a separate piece it is desirable that the means for explosion-protecting the cavity formed between the open elements of the current conducting part of each through terminal be fashioned as engageable members fabricated from an insulating material on which there are secured the movable and fixed elements of the current conducting part of each through terminal, and at least one assembly for connecting part of the movable element with the member fabricated from an insulating material inside the cavity.

In order to ensure a greater ease of servicing, the means for explosion-protecting the cavity between the open elements of the current conducting part of each through terminal has the form of members fabricated from an insulating material, mutually engageable through a blast-resistant wall and disposed at the opposite sides thereof with the movable and fixed elements of the current conducting part of each through terminal secured on these elements, and at least one assembly for connecting part of the movable element to the member made of an insulating material inside the cavity.

The invention allows to considerably simplify the explosion-proof electrical unit structurally, reduce its weight, size, and amount of labor consumed for its manufacture. It also ensures a higher operation reliability thanks to reducing the number of connections between current conductors and lowering the temperature of the elements of the unit susceptible to heating.

BRIEF DESCRIPTION OF THE DRAWINGS

The invention will now be described in greater detail with reference to various preferred embodiments thereof taken in conjunction with the accompanying drawings, in which:

FIG. 2 shows an enlarged view of one embodiment of a through terminal with movable and fixed elements of the current conducting part;

FIG. 3 is an enlarged view of a modified form of the through terminals of the proposed unit having one common explosion protection means for all the elements of the current conducting parts;

FIG. 4 is an enlarged view of another modified form of the through terminals having three elements of the current conducting part, when the movable elements are capable of rectilinear motion;

FIG. 5 is an enlarged view of one more modified form of the through terminal having the longitudinal axes of the fixed elements of the current conducting part set at an angle to each other;

DETAILED DESCRIPTION OF THE INVENTION

Figure 1:
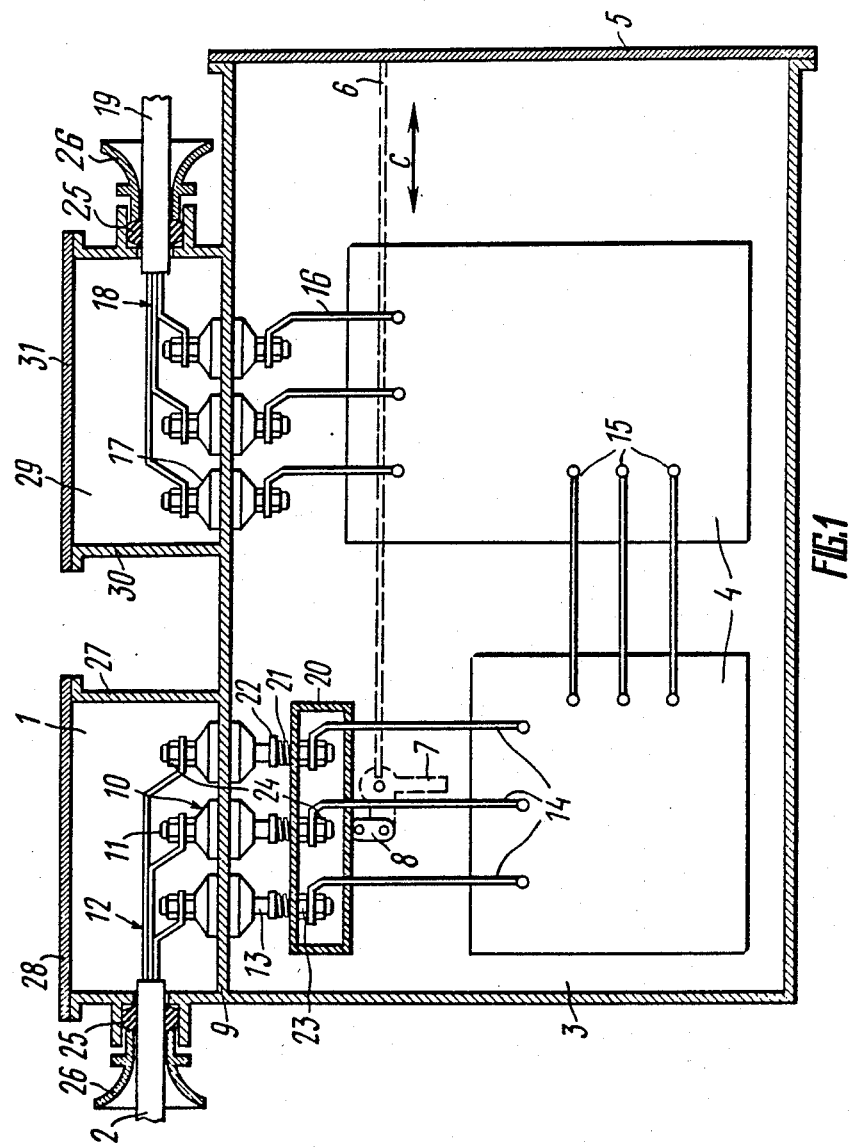
FIG. 1 is a general view of an explosion-proof electrical unit according to the invention.

An explosion-proof electrical unit comprises an explosion-protected intake chamber 1 (FIG. 1) for leading-in a feeding cable 2, and an explosion-protected equipment chamber 3. This explosion-protected equipment chamber 3 accommodates elements 4 of the electrical circuit of the explosion-proof electrical unit, such as switching devices (contactors, automatic switches), transformers, control, protection and signalling units. The chamber 3 is enclosed by a cover plate 5 mechanically connected by a blocking link 6 with a drive mechanism in the form of a handle 7 and a rod 8. The explosion-protected intake chamber 1 and the equipment chamber 3 are divided by a blast-resistant wall 9.

Secured at the blast-resistant wall 9 are through current conducting terminals 10. Elements 11 of the current conducting parts of the through terminals 10 arranged in the chamber 1 are electrically connected to cores 12 of the feeding cable 2. Elements 13 of the current conducting parts of the through terminals 10 arranged in the explosion-protected equipment chamber 3 are electrically wired by leads 14 and 15 with the elements 4 of the circuit.

Output leads 16 of the elements 4 of the electrical circuit are connected by through terminals 17 to cores 18 of a cable 19 feeding a load (not shown). The element 13 of the current conducting parts of the through current conducting terminals 10 are mechanically connected to the rod 8 of the drive mechanism through a frame 20 cooperating with springs 21 and stops 22 and 23.

The cores 12 and 18 of the cables 2 and 19, as well as the leads 14 and 16 are secured on the through current conducting terminals 10 and 17 by fastening members 24.

The cables 2 and 19 are sealed by means of sealing rings 25 and pressure cable sleeves 26.

The explosion-protected intake chamber 1 is, for example, formed by a wall 27 and cover plate 28, whereas an explosion-protected chamber 29 for leading out the current conductors is formed by a wall 30 and a cover plate 31.

The current conducting part of each terminal 10 (FIG. 2) includes at least two elements 11 and 13. The elements 13 can move, and in one extreme position of the movable element 13 this element 13 and the fixed element 11 are electrically connected or closed, whereas in the other extreme position these two elements are disconnected or open. The element 13, when moved in the direction indicated by the arrow A by the drive mechanism, breaks the electrical communication between the elements 11 and 13, which breaks the electrical connection between the elements 4 of the circuit and cores 12 of the feeding cable 2.

Each through current conducting terminal 10 is provided with a means for explosion-protection of a cavity 32 defined between the open movable element 13 and fixed element 11 of the current conducting part of the terminal 10. The explosion-protection means of the cavity 32 can be fashioned as mating members 33, 34 fabricated from an insulating material, on which there are mounted the movable and fixed elements 13 and 11 of the current conducting parts of each terminal 10, and at least one assembly for connecting part of the movable element 13 inside the cavity 32 with the member 33 made of an insulating material.

The explosion protection means of the cavity 32 (FIG. 3) can be also fashioned as the members 33 and 34 separated by the blast-resistant wall 9, fabricated from an electrically insulating material, and having secured thereon movable and fixed elements 13 and 11 of the current conducting part of each terminal 10, and at least one assembly for connecting part of the movable element 13 inside the cavity 32 with the member 33 made of an insulating material.

Part of the element 13 inside the cavity 32 has, for example, the form of a cone having the tapered surface thereof in tight contact with the tapered surface of the member 33 in the open position of the movable element 13 to form an explosion-proof connection.

The explosion-protection means can be provided separately for each of the through terminals, or can be common for all the through current conducting terminals.

The current-conducting part of each through terminal 10 can include three elements 11 (FIG. 4), 13, and 35. The movable element 13 is disposed between two fixed elements 11 and 35 of the current conducting part of each terminal 10. The movable element 13 is accommodated inside a member 36 fabricated from an insulating material mechanically connected to the rod 8 (FIG. 1) of the drive mechanism by pins 37 (FIG. 4).

The elements 11, 13, 35 can be arranged coaxially, or longitudinal axes 38 (FIG. 5) and 39 of the fixed elements 11 and 35 can be disposed at an angle to each other. Shown in FIG. 5 longitudinal axes 38, 39 of the fixed elements 11 are at an angle of 90° to each other.

Figure 6:
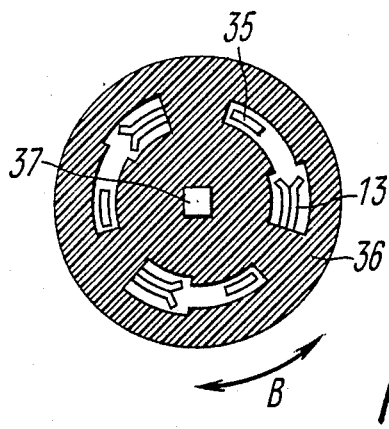
FIG. 6 is a schematic illustration of the arrangement of the through terminals, when the movable elements are capable of circumferential motion.

The movable element 13 of the current conducting part of each through terminal 10 can be capable of rectilinear travel in the direction indicated by the arrow A, or can move about a circumference as indicated in FIG. 6 by the arrow B.

Figure 7:
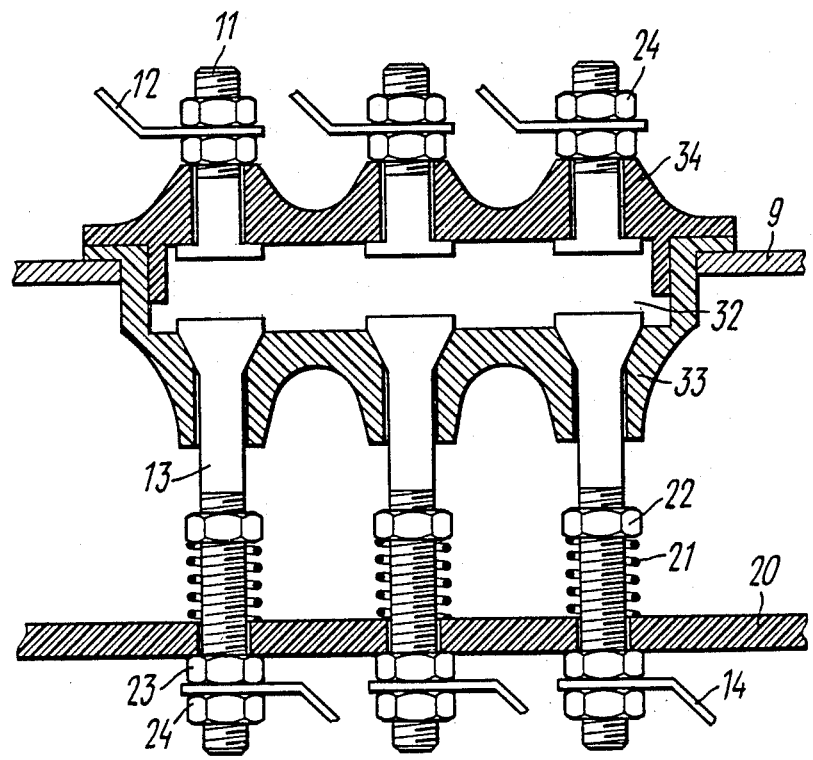
FIG. 7 is an enlarged view of a modified form of the through terminals, in which the cavity is protected against explosion through a means defined by engaging elements made of an insulating material, and at least one assembly for connecting part of the movable element inside the cavity with the element made of an insulating material.

Referring now to FIG. 7, the explosion-protection of the cavity 32 between the elements 11, 13 of the current conducting parts of each through terminal 10 can be formed exclusively by mating members 33 and 34 made of an insulating material and at least one assembly for connecting part of the movable element 13 inside the cavity 32 with the member 33 made of an insulating material, or formed by the members 33, 34 (FIG. 3) fabricated from an insulating material and arranged at two sides of the blast resistant wall 9, and at least one assembly for connecting part of the movable element 13 inside the cavity 32 to the element 33.

The proposed explosion-proof electrical unit, such as an explosion-protected magnetic starter, operates as follows. With the cover plate 5 (FIG. 1) in the closed position the blocking link 6 having, for example, the form of a pin can assume a position in which the handle 7 of the drive mechanism can be turned. With the cover handle plate 5 closed the pin 6 can be moved out toward the cover plate 5 as shown by the arrow C. The handle 7 is therefore released to be capable of being turned. The rod 8 and the frame 20 are caused to move upwards until the elements 13 and 11 of the current conducting parts of the terminals 10 are closed. The required contact pressure at the closed elements 11, 13 is ensured by the springs 21. By means of the flexible leads 14 and through terminals 10 the elements 4 of the electrical circuit of the unit are connected with the cores 12 of the feeding cable 2. A voltage is thereby applied to the elements 4 of the circuit for these elements to perform their function, such as to control (viz., energize or deenergize) the load (viz., an electric motor). The blocking link 6 moved toward the cover plate 5 prevents opening the cover plate 5 and access to the explosion-protected equipment chamber 3 in the presence of voltage at the elements 4 of the electric circuit of the unit inside the chamber 3. In this manner the proposed explosion-proof electrical unit carries out the functions of the known similar devices. However, it lacks an isolator, an explosion-protected chamber thereof, and a blast-resistant wall with through terminals between the explosion-protected chambers of the isolator and the equipment chamber. The functions of all these elements are performed by the through terminals 10, the current conducting part of each such terminals including at least two elements 11 and 13 with the element 13 being moved by the drive mechanism to ensure making or breaking the feeding circuit of the elements 4 of the electric circuit of the unit.

The cavity 32 (FIG. 2) between the contacting surfaces of the elements 11 and 13 of the current conducting parts of the through terminals 10 is explosion-protected only in the position of the movable elements 13 and drive mechanism in which it is possible to open the cover plate 5, that is in the open or disconnected position of these elements 11 and 13. This allows to simplify the construction of the proposed through terminal 10 and increase its resistance to wear during repeated closing and opening of the elements 11 and 13. FIG. 2 shows a preferred embodiment of this through terminal 10 ensuring explosion-protection of the cavity 32 exclusively in the position assumed by the element 13 in FIG. 2. The diameter of the cylindrical portion of the member 33 made of an insulating material can be substantially greater than the diameter of the cylindrical portion of the element 13. Therefore, in the closed position of the elements 11, 13 explosion protection of the cavity 32 may not be ensured, since it is not even necessary because the cover plate 5 is closed. The clearance between the walls of the members 33 and element 13 does not affect explosion-protection of the cavity 32, and therefore wear taking place in the cylindrical portion of the contact of the member 33 with the element 13 does not limit the maximum possible number of closings and openings of the elements 11, 13. In the open position of the elements 11 and 13 the tapered part of the surface of the element 13 rests tightly fit to the tapered portion of the surface of the member 33 forming therewith an explosion-proof connection. It stands to reason that as an explosion of gas in the cavity 32 and a consequent increase in pressure therein take place, the amount of pressure exerted on the element 13 increase to ensure an extra tight mating of the member 33 with the element 13 thereby ensuring a higher degree of protecting the cavity 32 from leakage of explosive gases therefrom.

Another merit of the proposed explosion-proof electrical unit is structural simplicity and minimized number of connections between current conducting parts due to dispensing with an isolator, an explosion-protected chamber thereof, and a blst-resistant wall with through terminals between the explosion-protected chambers of the isolator and equipment chamber. This in turn results in reduced weight, size and amount of labor to be consumed for fabrication of the proposed explosion-proof electrical unit, as well as in a higher reliability thereof.

The through terminal having a separate explosion-protected chamber 32 accommodating the elements 11, 13 of the current conducting parts of one terminal is so constructed as to standardize them for being suitable in a unit having any number of current conductors (phases, terminals).

FIG. 3, for example represents a modified form of the proposed unit, in which all the through terminals 10 are integrated into a single unit having an explosion-protected chamber 32 common for all the terminals 10.

One advantage of the heretofore desribed modifications of the current conducting parts of each through terminal provided with at least two elements resides in minimizing the number of contact connections in the circuits of the current conductors of the electrical unit. Therefore, these modified forms are preferable in explosion-proof units intended to operate on substantial rated currents (over 200–300 A), since such modifications ensure minimized overall loss of power at the contact connections, and consequently minimized heating of the elements in the chambers 1, 3 of such a unit.

The movable elements 13 of the current conducting parts of the through terminals are electrically connected with the elements 4 of the circuit of the explosion-proof unit by flexible leads 14. The use of such flexible leads 14 can be dispensed with in the modified forms of terminals having three elements 11 (FIG. 4), 13 and 35 of the current conducting part of each through terminal 10.

The members 33, 34 made of an insulating material have secured thereon the fixed elements 11, 35 of the current conducting parts of the through terminals 10. The movable elements 13 of the current conducting parts of the through terminals 10 are accommodated in the member 36 made of an electrically insulating material and mechanically linked with the rod 8 (FIG. 1) of the drive mechanism by the pin 37 (FIG. 4). In this embodiment explosion protection of the cavity 32 is ensured in any position of the movable elements 13 through engagement of the cylindrical surfaces of the pin 37 and member 33 made of an insulating material. Alternatively, the engagement between the members 36, 33 and pin 37 can be tapered, as shown in FIG. 2. In this case explosion protection of the cavity 32 will be ensured in the open position of the elements 11, 13 of the current conducting parts of the through terminals 10.

In the herein described embodiment the movable element 13 is disposed between two fixed elements 11, 35 coaxially therewith to be capable of rectilinear travel in the direction indicated by the arrow A, or to be capable of movement about a circumference as indicated in FIG. 6 by the arrow B.

One or the other modified form can be prederable depending on the structural arrangement of the proposed explosion-proof electrical unit and drive mechanism thereof. With the straight movement of the element 13 one of the fixed elements, such as element 35, should be of a length sufficient for ensuring electrical connection of the elements 11, 35 by the movable element 13 in the position illustrated in FIG. 4. When breaking the electric circuit between the elements 11, 35, the element 13 slides on the element 35, whereby position of the element is spatially fixed.

Therefore, when the movable element 13 is capable of straight or rectilinear movement, the area occupied by the through terminals is minimal, whereas the length of the terminals is increased by the distance of travel of the movable elements.

When the movable elements 13 (FIG. 6) move about a circumference in the direction indicated by the arrow B, the length of the through terminals 10 is minimized accompanied by an increase in the area occupied by the through terminals 10, since it is necessary to retain the distance between the elements 13 movable about the circumference and fixed elements 11, 35 in the open position.

Depending on the preferred construction of the proposed unit and on the arrangement of the parts of the drive mechanism, it is advisable to dispose the longitudinal axes 38 (FIG. 5), 39 of the elements 11, 35 of the current conducting parts of the through terminals 10 at an angle to each other, such as at an angle of 90°. Therewith, the movable element 13 and pin 37 connected to the drive mechanism move in the direction indicated by the arrow A, whereas the axis 39 of the fixed element 35 of the current conducting part of the terminal 10 rests at an angle 90° to the axis 38 of the fixed element 11. This arrangement allows to simplify the linkage between the drive mechanism with the movable element 13, such as in the case of a horizontal arrangement of the rod 8 (FIG. 1) and at a substantial distance from the handle 7 of the drive mechanism to the through terminals 10.

In the modifications of the proposed explosion-proof electrical unit shown in FIGS. 2 and 3, the explosion protecting cavity 32 between the elements 11, 13 of the current conducting part of each terminal 10 is defined by the engaging members 33, 34 made of an electrically insulating material and separated by the blast-resistant wall 9 between these members, and at least one assembly for connecting part of the movable element 13 to the member made of an insulating material, thee members 33 and 34 being mounted at the opposite sides of the wall 9 during the assembly of the unit.

Most suitable for the production of the through terminals 10 and the explosion-proof electrical unit according to the invention is the modification of the explosion-protected cavity 32 making use of only the members 33 (FIG. 7) and 34 made of an electrically insulating material. In this case the entire assembly of the through terminals 10 can be put together before accommodating it inside the explosion-proof electrical unit, whereas explosion protection between the chambers 1, 3 is ensured by the engaging surfaces of one member 33 or 34 against the blast-resistant wall 9.

In view of the foregoing, the present invention allows to structurally simplify an explosion-proof electrical unit, reduce it overall weight and size, as well as ensure a higher operation reliability of the unit.

What is claimed is:

1. An explosion-proof electrical unit for ensuring an electrical connection of a load with a current source through cores of a feeding cable comprising:
    an explosion-protected lead-in chamber with leading-in current conductors of lead-in feeding cable;
    an electric circuit to control and protect the load;
    elements of said electric circuit;
    an explosion-protected equipment chamber having said elements of said electric circuit therein;
    a cover plate of said explosion-protected equipment chamber;
    only one blast-resistant wall separating said explosionprotected lead-in chamber and said explosion protected equipment chamber;
    through current-conducting terminals secured on said blast-resistant wall making an electrical connection of the elements of said electric circuit with the cores of said feeding cable;
    a current conducting part of each said through terminal;
    said current conducting part of each said through terminal including at least two elements;
    one element of said two elements being movable in two expreme positions to break the electrical connection between the elements of said electric circuit and said cores of said feeding cable;
    said two elements electrically closed in one said extreme position of said movable element;
    said two elements electrically open in said other extreme position of said movable element;
    a drive mechanism having means for moving said movable elements of the current conducting parts of said through terminals and being mechanically linked with said cover plate of said explosion-protected equipment chamber and with said movable elements of said current conducting parts of said through terminals;
    a cavity formed between said open movable and fixed elements of said current conducting part of each said through terminal;
    an explosion-protecting means in said cavity;
    each said through terminal provided with said explosion-protecting means of said cavity.

2. An explosion-proof electrical unit as defined in claim 1 comprising:
    said elements of said current conducting part of each said through terminal being arranged coaxially.

3. An explosion-proof electrical unit as defined in claim 1 comprising:
    said movable element of said current conducting part of said through terminal being arranged to be capable of rectilinear motion.

4. An explosion-proof electrical unit as defined in claim 1 comprising:
    said movable element of said current conducting part of each said through terminal being arranged to be capable of circumferential motion.

5. An explosion-proof electrical unit as defined in claim 1 comprising:
    first and second members of said through terminals made of an insulating material;
    said movable element secured on said first member;
    said fixed element secured on said second member;
    an interior of said cavity;
    an assembly for connecting part of said movable element in the interior of said cavity to said first member of said through terminal;
    said explosion-protecting means of said cavity having the form of said engageable first and second members and at least one said assembly for connecting part of said movable element to said first member.

6. An explosion-proof electrical unit as defined in claim 1 comprising:
    first and second members of said through terminals being made of an insulating material;
    said movable element secured on said first member;
    said fixed element secured on said second member;
    an interior of said cavity;
    an assembly for connecting part of said movable element in the interior of said cavity to said first member of said through terminal;
    said explosion-protecting means of said cavity having the form of said first and second members interconnected by said blast-resistant wall and disposed at the opposite sides of said blast-resistant wall, and at least one said assembly for connecting part of said movable element of said first member.

7. An explosion-proof electrical unit ensuring an electrical connection of a load with a current source through current conducting cores of a feeding cable comprising:
    an explosion-protected lead in chamber with leading-in current conductors of lead-in feeding cable;
    an electric circuit to control and protect the load;
    elements of said electric circuit;
    an explosion-protected equipment chamber having said elements of said electric circuit therein;
    a cover plate of said explosion-protected equipment chamber;
    only one blast-resistant wall separating said explosion-protected lead-in chamber and said explosion protected equipment chamber;
    through current-conducting terminals secured on said blast-resistant wall making an electrical connection of the elements of said electric circuit with the cores of said feeding cable;
    a current conducting part of each said through terminal;

said current conducting part of each said through terminal including at least three elements;

one element of said three elements being movable in two extreme positions to break the electrical connection between the elements of said electric circuit and said cores of said feeding cable; two elements of said three elements being fixed;

said movable element disposed between two said fixed elements of said current conducting part of each said through terminal;

said three elements being electrically closed in said one extreme position of said movable element;

said three elements being electrically open in said another extreme position of said movable element;

a drive mechanism having means for moving said movable elements of the current conducting part of each said through terminal and being mechanically linked with said cover plate of the explosion-protected equipment chamber and with said movable elements of said current conducting parts of said through terminals;

a cavity formed between said open movable and fixed elements of said current conducting part of each said through terminal;

an explosion-protecting means in said cavity;

each said through terminal provided with said explosion-protecting means of said cavity.

8. An explosion-proof electrical unit as defined in claim 7 comprising:

said fixed and movable elements of said current conducting part of each said through being terminal arranged coaxially.

9. An explosion-proof electrical unit as defined in claim 7 comprising:

a longitudinal axis of each said fixed element of said current conducting part of each said through being terminal;

said longitudinal axes of said fixed elements of said current conducting part of each said through being terminal arranged at an angle to each other.

10. An explosion-proof electrical unit as defined in claim 7 comprising:

said movable element of said current conducting part of each said through being terminal arranged to be capable of rectilinear motion.

11. An explosion-proof electrical unit as defined in claim 7 comprising:

said movable element of said current conducting part of each said through being terminal arranged to be capable of circumferential motion.

12. An explosion-proof electrical unit as defined in claim 7 comprising:

first and second members of said through being terminal both made of an insulating material;

said movable element secured on said first member;

said fixed element secured on said second member;

an interior of said cavity;

an assembly for connecting part of said movable element in the interior of said cavity to said first member of said through terminal;

said explosion-protecting means of said cavity comprising said engageable first and second members and at least one said assembly for connecting part of said movable element to said first member.

13. An explosion-proof electrical unit ensuring an electrical connection of a load with a current source through current conducting cores of a feeding cable comprising:

an explosion-protected lead-in chamber with leading-in current conductors of lead-in feeding cable;

an electric circuit to control and protect the load;

elements of said electric circuit;

an explosion-protected equipment chamber having said elements of said electric circuit therein;

a cover plate of said explosion-protected equipment chamber;

only one blast-resistant wall separating said explosion-protected lead-in chamber and said explosion-protected equipment chamber;

through current conducting terminals secured on said blast-resistant wall making an electrical connection of the elements of said electric circuit with the cores of said feeding cable;

a current conducting part of each said through terminal;

said current conducting part of each said through terminal including at least two elements;

one element of said two elements being movable in two extreme positions to break the electrical connection between said elements of said electric circuit and said cores of said feeding cable;

said two elements electrically closed in one said extreme position of said movable element;

said two elements electrically open in said other extreme position of said movable element;

a drive mechanism having means for moving said movable elements of the current conducting parts of said through terminals and being mechanically linked with said cover plate of the explosion-protected equipment chamber and with said movable elements of said current conducting parts of said through terminals;

a cavity formed between said open movable and fixed elements of said current conducting part of each said through terminal;

an explosion-protecting means in said cavity;

each said through terminal provided with said explosion-protecting means of said cavity;

first and second members of said through terminal fabricated from an insulating material;

said movable element secured on said first member;

said fixed element secured on said second member;

an interior of said cavity;

an assembly connecting part of said movable element in the interior of said cavity to said first member of said through terminal;

said explosion-protecting means of said cavity comprising said first and second members interconnected by said blast-resistant wall and disposed at the opposite sides of said blast-resistant wall, and at least one said assembly for connecting part of said movable element to said first member.

14. An explosion-proof unit for making an electrical connection of an electricity-feeding cable at least to an element of an electrical circuit in the unit, the unit comprising:

only one blast-resistant wall;

intake-chamber means on one side of the blast-resistant wall defining, together, with the blast-resistant wall, an explosion-protected intake chamber, the intake-chamber means comprising seal means for sealingly leading at least conductors of an electricity-feeding cable into the intake chamber;

equipment-chamber means on an opposite side of the blast-resistant wall defining, together with the blast-resistant wall, an explosion-protected equipment chamber, whereby the intake and equipment chambers are directly separated by the blast-resistant wall, the equipment chamber being for receiving at least an element of an electrical circuit, the equipment-chamber means comprising an opening into the equipment chamber and a cover plate for closing the opening and, thereby, the equipment chamber;

current-conductor means insulated from and extending through the blast-resistant wall from the intake chamber to the equipment chamber opening and closing electrical connections from the conductors of the cable to the element of the circuit, each of the current-conductor means comprising at least one insulating member for the insulating of the current conducting means from the blast-resistant wall and defining a cavity, a fixed current-conducting resistant element fixed in the insulating member to extend from one end in one of the intake and equipment chambers for connection to the one of one of the conductors and element therein to an opposite end in the cavity, a movable current-conducting element movably in the insulating member to extend from one end in the other of the intake and equipment chambers for connection to the one of on of the conductors and element therein to an opposite end in the cavity, the movable current-conducting element being movable from the one of the intake and equipment chambers its one end is in between first and second extreme positions, in the first extreme position the opposite ends of the fixed and movable current-conducting elements being in contact with each other for the closing of the electrical connection from the one conductor of the cable to the and in the second extreme position the opposite ends of the fixed and movable current-conducting elements being spaced from each other for the opening of the electrical connection from the one conductor of the cable to the element, and explosion-protecting means in the cavity operative for protection from explosion from the cavity at least when the movable current-conducting element is in the second extreme position; and a drive mechanism comprising operation means for operating the drive mechanism between first and second conditions frm outside the intake and equipment chambers, moving means inside the one of the intake and equipment chambers the one ends of the movable current-conducting elements are in and responsive to the operation of the operation means between the first and second conditions thereof respectively for moving the movable current-conducting elements between first and second extreme positions thereof, and linking mans linking the drive mechanism and the cover plate for keeping the cover plate closing the opening only when the operation means is in the first condition.

* * * * *